3,525,631
MANUFACTURE OF CERAMIC BODIES

William B. Brown, Jr., Farmingdale, and Kenneth H. Brinsmead, Northport, N.Y., assignors to Avnet, Inc., a corporation of New York
No Drawing. Filed Aug. 2, 1965, Ser. No. 476,671
Int. Cl. C04b 35/18, 35/48
U.S. Cl. 106—57                    12 Claims

ABSTRACT OF THE DISCLOSURE

A process of preparing ceramic articles comprising shaping a slurry of refractory particles and a gelling solution of phosphoric acid and alkyl silicate, allowing the shaped slurry to gel, and then firing the gelled shape.

---

This invention relates to the manufacture of ceramic bodies of the class attainable by the Shaw process, hereinafter described. More particularly, it is directed to improving and simplifying the manufacture of ceramic bodies of markedly superior characteristics.

The Shaw process, described in U.S. Pat. 2,795,022 is based on the utilization of a silicic acid sol as a binder for ceramic particles. That process has found great application in a variety of uses, as for example, in the art of investment casting by the lost wax art, the manufacture of ceramic molds and cores, the manufacture of refractory shapes, etc. Silicic acid sols are prepared by the partial hydrolysis of alkyl esters of silicic acid. A frequently used starting material for the preparation of such sols is an ethyl silicate having a silica content ranging from 28 to 56%. The ester is partially hydrolyzed with water in the presence of a mutual solvent, e.g., an alkanol, aldehyde or ketone. The hydrolysis is effected by a catalyst, either acidic or alkaline, most frequently the catalyst being a strong acid such as hydrochloric or sulfuric.

In our pending applications, Ser. No. 301,601 filed Aug. 12, 1963, now U.S. Pat. No. 3,313,737, and Ser. No. 384,785 filed July 23, 1964, now abandoned, we have described improvements in the method of preparing silicic acid sols, and the novel sols so produced; and set forth the advantages which they provide. The silicic acid sols of our pending applications are characterized, inter alia, by marked stability during storage. However, even though the storage life of the silicic acid sols of our pending applications mark a great advance in this art, they do have a limited life.

We have now found that it is possible to effect bonding of ceramic particles by means of the alkyl silicates without the need to convert the alkyl silicates into silicic acid sols; and to produce thereby ceramic bodies of outstanding desirable characteristics.

Accordingly, it is among the principal objects of this invention to effect the bonding of ceramic particles which enables one to produce ceramic bodies of notable characteristics.

Another object of this invention is to provide this art with means of effecting bonding of ceramic particles by use of an alkyl silicate which does not require the prior transformation of the alkyl silicate into a silicic acid sol for the use thereof in manufacturing ceramic bodies.

In its fundamental aspects the foregoing objects arise from our discovery that an admixture of an alkyl silicate with phosphoric acid constitutes a solution which forms a slurry with ceramic particles; and that the slurry undergoes gelation to yield a "green" shape which upon firing results in a ceramic body.

The alkyl silicate can be the orthosilicic acid ester, e.g., Si(O Alkyl)$_4$, frequently referred to as the monomer, or a condensed organic silicate. The silica content, in the case of the ethyl ester, ranges from 28%, in the instance of the monomer to about 56% in the instance of the relatively highly condensed esters. The most frequently used alkyl ester in this art is the ethyl silicate designated as ethyl silicate 40 (silica content 40%).

The phosphoric acid is conveniently used in the form of a solution thereof in a lower alkanol, most frequently denatured ethanol, 190 proof. We have found that ethyl silicate 40 undergoes gelation when the molar ratio of the phosphoric acid ($H_3PO_4$) to the silica ($SiO_2$) in the alkyl silicate ranges from 1:18 to 5:1; and when the molar content of the phosphoric acid in the ethanolic solution ranges from 0.5 M to 19.5 M.

The phosphoric acid solution is conveniently prepared by the dissolution of 85% phosphoric acid in the ethanol. For instance, 5 parts by volume of the ethanol may be added to 3 parts by volume of 85% $H_3PO_4$, mixing the two until the solution is uniform; and allowing the solution to cool to room temperature.

It has been found that 20 parts by volume of the phosphoric acid solution when added to 50 parts by volume of ethyl silicate 40 and mixed thoroughly for about 15 seconds, results in a mixture which gels in approximately 8 minutes.

When 60 parts by volume of the phosphoric acid solution are added to 50 parts by volume of ethyl silicate 40 and mixed thoroughly for 15 seconds, the mixture gels in about 1.5 to 2 minutes.

When such admixtures consisting of the ethyl silicate and the phosphoric acid solution are worked up into slurries by the incorporation of appropriate amounts of refractory aggregates, the gel time is not affected unless the refractories are either extremely basic or acidic. Thus, when using refractories which in the acidic environment (the mixture of the phosphoric acid and the alkyl silicate) are relatively inert, for example, zircon, olivine, silica, sillimanite, kyanite, mullite and other alumino-silicates, the gelling time is the interaction time of the alkyl silicate and the phosphoric acid.

We have discovered that ceramic bodies resulting from gelation of ceramic particles which are incorporated in our novel gelling solution consisting of the alkyl silicate and the phosphoric acid, followed by the firing thereof in accordance with the procedures customarily employed in this art to convert the green shape into the finished object are relatively inert, for example, zircon, olivine, silica, bodies are 5 to 10 times that of corresponding ceramic bodies prepared by the use of silicic acid sols (as binders) with equivalent silica contents.

The following are examples in accordance with this invention.

EXAMPLE 1

50 mls. of ethyl silicate 40 and 50 mls. of a solution consisting of 5 parts by volume of ethanol (190 proof) and 3 parts by volume of 85% $H_3PO_4$, prepared as above described, were mixed together for 10 seconds. Then 612 grams of blended zircon were added to the liquid and mixed for 10 seconds. The slurry was poured into molds for production of standard test rods (7" x ½"). The slurry gelled in about 2 minutes. Ten minutes after gelation took place, the green shapes were removed, torched, and baked out in an oven at 2000° F. for 10 minutes. These rods were allowed to cool and tested for flexural strength, in comparison with similar rods conventionally prepared but using a silicic acid sol as described in our pending applications as a binder which provided the same silica content.

The average transverse breaking load of the fired rods prepared as described in this example is 7,600 grams. The average transverse breaking load of the conventionally prepared test pieces is 1,450 grams.

EXAMPLE 2

250 mls. of ethyl silicate 40 and 250 mls. of a solution consisting of 5 parts by volume of ethanol (190 proof) and 3 parts by volume of 85% $H_3PO_4$, prepared as above described, were mixed together for 20 seconds.

Then 3,200 grams of zircon blend were added to the liquid mixture and mixed for 20 seconds.

The slurry was poured into a die-casting die pattern. The slurry gelled in 2 minutes. Five minutes after gelation took place the mold and pattern were separated. The mold was then ignited to allow the volatiles to burn off; and thereafter fired at 2000° F. for one hour.

EXAMPLE 3

50 mls. of ethyl silicate 28 and 60 mls. of the phosphoric acid-ethanol solution described in Example 1 were mixed as described above. To this liquid mixture were added 455 grams of blended olivine.

This batch of the slurry was poured into standard rod shaped patterns; allowed to gel; and then, stripped, torched and fired as described in Example 1.

The average transverse breaking load of these fired ceramic bodies is 5,400 grams.

The average transverse breaking load of similar bodies conventionally prepared but using a silicic acid sol, as described in our pending applications, as the binder which provided the same silica content, is 585 grams.

In addition to the foregoing gelling solutions, of which those in Examples 1 and 2 are currently preferred, the following are further examples of gelling solutions for manufacturing ceramic bodies in accordance with this invention.

EXAMPLE 4

A gelling solution is prepared by mixing 150 mls. of ethyl silicate 40 and 30 mls. of a solution consisting of 5 parts by volume of 190 proof ethanol and 3 parts by volume of 70% $H_3PO_4$.

The solution gels in 650 seconds.

The molar ratio of the phosphoric acid to silica is 1:18. The molar content of the $H_3PO_4$ in the ethanol solution is 4.75 M.

EXAMPLE 5

A gelling solution is prepared by mixing 50 mls. of ethyl silicate 28 and 110 mls. of a solution consisting of 3 parts by volume of 190 proof ethanol and 7 parts by volume of 85% $H_3PO_4$.

The solution gels in 30 seconds.

The molar ratio of the phosphoric acid to silica is 1:0.22.

The molar content of the $H_3PO_4$ in the ethanol solution is 10.3 M.

EXAMPLE 6

A gelling solution is prepared by mixing 50 mls. of ethyl silicate 52 and 50 mls. of a solution consisting of 5 parts by volume of 190 proof ethanol and 3 parts by volume of 85% $H_3PO_4$.

The solution gels in 210 seconds.

The molar ratio of the phosphoric acid to silica is 1:1.16.

The molar content of the $H_3PO_4$ in the ethanol solution is 5.32 M.

It will be observed that the instant invention is characterized by notable advantages. This invention eliminates the preparation of silicic acid sols (binders) from the alkyl silicate. Moreover, since the ethyl silicate per se and the phosphoric acid solution in ethanol per se are stable, the problems of stability of the binders heretofore used (silicic acid sols) are eliminated.

Furthermore, molds and ceramic bodies produced in accordance with the instant invention possess vastly improved fired strength as compared with the fired strength of ceramic bodies prepared by the conventional methods heretofore used. Additionally, such outstanding increases in strength are achieved at a greatly reduced cost. It will be understood that the only limitation with the firing temperature is the melting or fusion temperature of the body being fired, taking into consideration the added production costs when the bodies are fired at temperatures in excess of 2000° F., or at lower temperatures for prolonged periods.

We have also found that the addition of acids which dissociate more readily than phosphoric acid, e.g., sulfuric or hydrochloric acids, etc., accelerate the gelling reaction. Thus, addition of 0.001 to 5% of HCl (by volume) markedly speeds up the gelling.

We further found that a solution consisting of anhydrous phosphoric acid, the alkyl silicate and anhydrous mutual solvent (for the anhydrous acid and the ester) does not gel until water is added thereto. Thus, we have kept a solution of anhydrous phosphoric acid, anhydrous ethanol and ethyl silicate 40 for a period in excess of 6 months.

An example of the gelling effect of water is the following: a solution consisting of 69.7 mls. anhydrous phosphoric acid, 180.3 mls. of anhydrous ethanol and 250 mls. of ethyl silicate 40, gels in 4 minutes 40 seconds upon the addition thereto of 20 mls. of water; gels in 2 minutes 30 seconds upon the addition of 30 mls. of water thereto; and gels in 2 minutes 10 seconds upon the addition of 40 mls. of water.

It will be apparent therefore, that the basic gellable solution of this invention is constituted of anhydrous phosphoric acid, alkyl silicate and anhydrous mutual solvent for the phosphoric acid and the ester; and that the gelation thereof is effected by the action of water, the amount of which, for any particular solution, is a certainable by simple testing. The gelation time of such an anhydrous (three components) solution can readily be determined by the simple addition of measured amounts of water to aliquots of the anhydrous solution.

Accordingly, a stock solution consisting of anhydrous phosphoric acid, alkyl silicate, and anhydrous mutual solvent therefor, can be used to make up a gellable slurry as described above by the addition of water. As has been stated, the time of gelation of such a solution, when added thereto, can be determined by simple testing as above described or any other suitable method. Thus, it is easy to determine how much water should be added to produce a gelation within a desired interval of time.

It is to be noted that the addition of water to such stock anhydrous solutions so as to constitute mixtures having the same contents of the components as above set forth for manufacturing ceramic bodies, produces the results attained when the water-containing components constitute the starting materials.

The term "torched" in Examples 1 and 3 designate the ignition of the green shape to allow the volatiles to burn off as described in Example 2. The shaped gel is fired at a temperature of at least 400° F.

It will be understood that the foregoing description of the invention and the examples set forth are merely illustrative of the principles thereof. Accordingly, the appended claims are to be construed as defining the invention within the full spirit and scope thereof.

We claim:

1. Method of manufacturing a ceramic body which comprises:
    (1) shaping, into desired configuration, a slurry comprising:
        (a) refractory particles, and
        (b) a gelling solution comprising:
            phosphoric acid and alkyl silicate, the molar ratio of phosphoric acid to the silica content of the alkyl silicate being in the range of about 1:18 to 1:02;
    (2) allowing the shaped slurry to gel; and
    (3) firing the gelled shape.

2. Method in accordance with claim 1, wherein the solution comprises phosphoric acid dissolved in a solvent mutual to it and the alkyl silicate.

3. Method in accordance with claim 2, wherein the alkyl silicate is ethyl silicate.

4. Method in accordance with claim 3, wherein the ethyl silicate has a silica content of about 40%.

5. Method in accordance with claim 4, wherein the mutual solvent is ethanol.

6. Method in accordance with claim 5, wherein the molar content of the phosphoric acid in the ethanolic solution thereof ranges from about 0.5 M to 19.5 M.

7. Method in accordance with claim 6, wherein the solution of phosphoric acid in ethanol is formed from 85% phosphoric acid.

8. Method in accordance with claim 1, wherein the shaped gel is fired at a temperature of at least 400° F.

9. Method of manufacturing a ceramic body which comprises:
 (1) shaping into desired configuration, a slurry comprising:
  (a) refractory particles, and
  (b) a gelling solution comprising:
   (i) phosphoric acid dissolved in ethanol, and
   (ii) ethyl silicate containing about 40% silica whereof the molar ratio of the $H_3PO_4$-to-$SiO_2$ is in the range of about 1:18 to 1:0.2, and the molar content of the $H_3PO_4$ in the ethanol solution thereof is in the range of about 0.5 M to 19.5 M;
 (2) allowing the shaped slurry to gel; and
 (3) firing the gelled shapes at a temperature of at least 400° F.

10. Method in accordance with claim 2, wherein the solvent is anhydrous.

11. Method in accordance with claim 10, wherein water is added to the gelling solution.

12. Method in accordance with claim 5, wherein water is added to the gelling solution.

References Cited

FOREIGN PATENTS 242,266 12/1962 Australia.
641,159 5/1962 Canada.
641,160 5/1962 Canada.

JAMES E. POER, Primary Examiner

U.S. Cl. X.R.

106—60, 65, 69